United States Patent [19]
Loos

[11] 3,832,672
[45] Aug. 27, 1974

[54] GROUNDING COUPLING FOR ELECTRICAL WIRE RACEWAYS

[76] Inventor: John R. Loos, 2801 Maple St., Fargo, N. Dak. 58102

[22] Filed: Apr. 2, 1973

[21] Appl. No.: 347,390

[52] U.S. Cl. .................. 339/13, 174/78, 174/84 S, 339/14 L
[51] Int. Cl. ..................... H01r 3/06, H02g 3/06
[58] Field of Search ........... 174/51, 64, 65 R, 71 R, 174/72 R, 78, 84 S; 339/13, 14 L

[56] References Cited
UNITED STATES PATENTS
1,036,296   8/1912   McMurtrie ............... 174/65 R UX FOREIGN PATENTS OR APPLICATIONS
33,455   7/1924   Denmark ................... 174/71 R
394,201   4/1924   Germany ................... 174/51
604,288   7/1948   Great Britain .............. 174/78
734,188   7/1955   Great Britain .............. 174/78
1,640,074   8/1970   Germany ................... 174/78

Primary Examiner—Laramie E. Askin
Attorney, Agent, or Firm—Dugger, Johnson & Westman

[57] ABSTRACT

A coupling for raceways, such as thin wall conduit (EMT) or rigid conduit for electrical wires for joining such conduit to another type of raceway, and incorporating a grounding terminal integrally with the coupling to permit connection of an internal grounding wire.

5 Claims, 3 Drawing Figures

PATENTED AUG 27 1974 3,832,672

GROUNDING COUPLING FOR ELECTRICAL WIRE RACEWAYS

BACKGROUND OF THE INVENTION

1. Field of the Invention

The present invention relates to couplings for electrical raceways that include grounding terminals.

2. Prior Art

The use of various grounding connectors between boxes and conduit is known. U.S. Pat. No. 2,710,381 has a grounding connector for a box which includes a grounding lug or terminal that is laterally offset from the box connector. U.S. Pat. No. 1,941,905 also shows a grounding device that comprises a disc that fits inside a conduit to box connector and a screw that extends outwardly from the connector. U.S. Pat. No. 660,741 includes a grounding device having a type of a collar that has a terminal on it. U.S. Pat. No. 3,187,085 uses a screw to attach a conduit to a connector, where a conduit is mounted over the exterior of the hub or connector.

SUMMARY OF THE INVENTION

The present invention has relation to a coupling sleeve for two lengths of different types of conduit or raceway for electrical wire. The coupling is used for joining a rigid or thin wall conduit, which can be used as an equipment grounding conductor for electrical devices, to a flexible conduit, for example, which is not always approved as an equipment grounding conductor for an electric motor, for example. This means that a separate ground wire must be run from the coupling to the motor. The coupling for raceways includes a lug that provides a screw tightened ground connection for a ground wire to extend from the raceway coupling to the motor.

The lug is designed to receive a length of wire into a recess or opening with a backing surface, and a screw that extends transversely to the wire is used to press the wire against the backing surface. The screw is accessible from the exterior of the coupling, and can be placed into a blind hole or a through hole in the side wall of the coupling sleeve. The attachment between the coupling and the raceway is in the normal manner, either by threading, in the example of rigid conduit, or by a separate screw or compression collar that is used for thin wall conduit. A split bottom portion of the coupling is used, as shown for clamping the coupling onto flexible conduit leading to the motor.

DESCRIPTION OF THE PREFERRED EMBODIMENT

Figures 1, 2, 3:
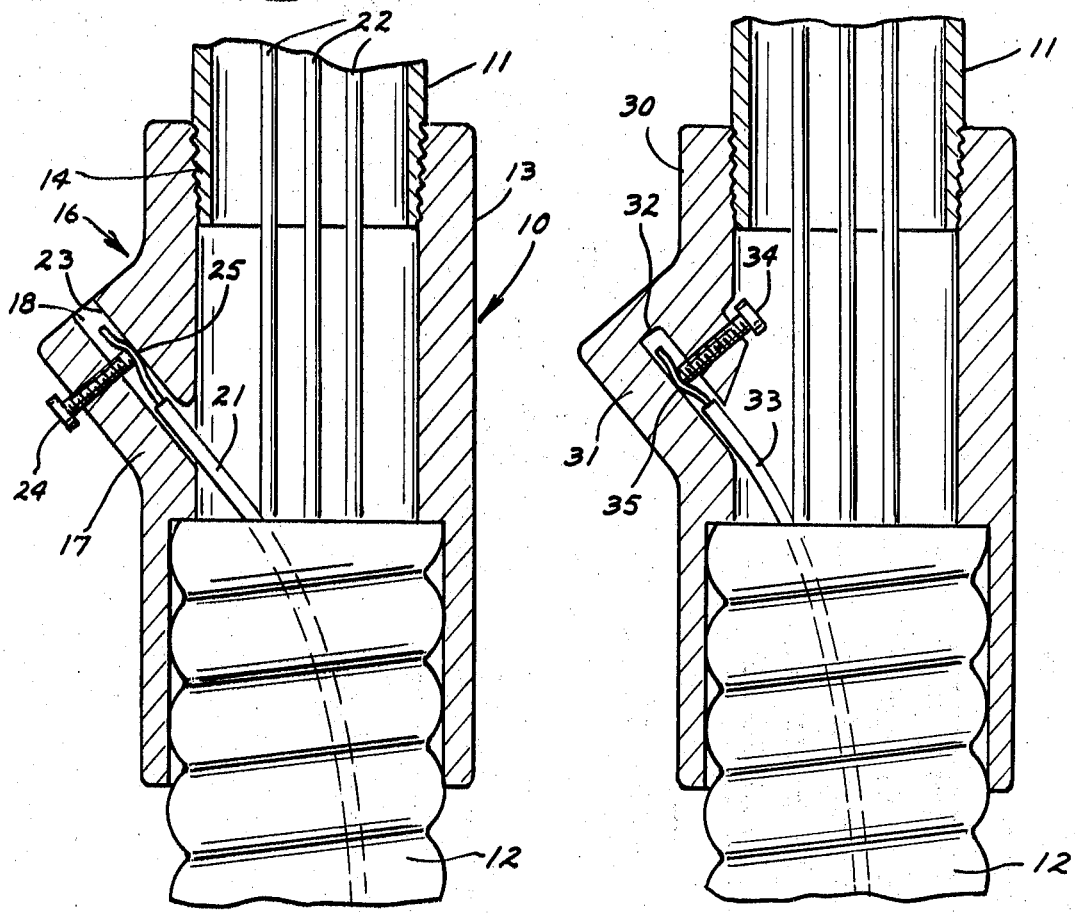
FIG. 1 is a schematic perspective view showing an electric motor with a flexible conduit lead coupled to a rigid conduit, and utilizing the coupling made according to the present invention thereon.
FIG. 2 is a vertical sectional view taken along the line 2—2 in FIG. 1 of a coupling shown in FIG. 1, and showing in detail a grounding lug made according to the present invention on the side of the coupling.
FIG. 3 is a sectional view of the modified form of the grounding lug in a coupling as shown in FIG. 1.

Referring to the drawings and the numerals of reference thereon, the grounding coupling illustrated generally at 10 comprises a tubular raceway coupling that is used for coupling a thin wall or rigid conduit 11, and a different type of raceway such as a flexible conduit 12. The motor 9, which is wired as shown, requires a separate ground, and the flexible conduit 12 is not always a suitable ground member under the electrical code. Thus, in the usual instance, the coupling between the rigid conduit and the flexible conduit is used as an external lug or fastening, for example the grounding wire is fastened at the split collar portion thereof. A separate external ground wire then extends down to the motor. The same is true if the thin wall or rigid conduit is coupled to plastic, fiber or liquid tight flex coupling.

However, in the present invention the coupling is provided with a grounding terminal or lug, which is positioned so that the tightening screw can be reached from the exterior of the coupling but accepts a wire on the interior of the raceway. Referring now to FIG. 2, the coupling 10 as shown is a tubular member 13 which has a threaded end 14 for attaching it to the rigid conduit 11 in a conventional manner. If thin wall conduit (EMT) is used for the first raceway, suitable means for attaching that to the coupling can be used, including an external compression collar. At the lower end of the tubular member 13 as shown in FIG. 2 there is a split collar 15 that is used for attaching the coupling to the flexible conduit 12. The split collar has a screw or bolt member that can be tightened to clamp the flexible conduit in place. The collar 15 is shown schematically in FIG. 1.

FIG. 2, the grounding terminal indicated generally at 16 takes the form of a lug or boss portion 17 formed into the side wall of the tubular member 13 adjacent one side thereof, and a through hole 18 extending through the boss 17 from the interior of the tubular member and to the exterior. The hole 18 is of size to receive a ground wire 21 that will be used for grounding the motor, and this ground wire is separate from the wires 22 that are used for supplying power. As shown, the hole 18 has a cylindrical internal surface, and a portion of the internal surface of the hole 18, indicated at 23, forms a backing surface for the wire 21. A screw 24 is threaded through an opening in the boss 17 at substantially right angles to the axis of the hole 18, so that the end of the screw 24 bears against the ground wire 21 and forces it against the surface 23, as shown at 25. This forms a secure grounding connection, and it is simply done by tightening the screw from the exterior of the coupling.

Thus a very neat ground wire connection is made because there is no need for having an exterior wire attached to the coupling which extends down to the motor and gets in the way, and forms an unsightly appearance for the wiring job.

In FIG. 3, a modified form of the invention is shown. Coupling 10, is used in the same manner as before, and connects to the flexible conduit 12 at the lower portion of the coupling.

This tubular member 30 has a boss 31 along one side thereof, and the boss 31 is provided with a blind hole or recess 32 opening to the interior of the tubular member 30, and the recess is of size to receive a ground wire 33. A screw 34 is threaded into a portion of the wall of the tubular member adjacent the boss 31, and at substantially right angles to the axis of the blind hole 32, so that when the screw is threaded in, it will be tightened down against the ground wire 33. The wire 33 is forced against a surface portion 35 defining the hole 32. This provides the secure ground necessary for operation of the motor with safety.

It can be seen also that the screw 34 is accessible with a screwdriver from the exterior of the coupling tube 30. The ground wire is put into place before the conduit 12 is threaded in. The ground wire of course can be put into place and then the rest of the wires threaded through later, after the conduit and coupling have been assembled together.

Thus, in both forms of the invention, a boss is provided in the wall of the tubular coupling, and a hole is provided for the grounding wire. A cross screw is threaded through a portion of the wall of the tubular coupling so that it will force the ground wire against a surface defining the opening. The openings of course do not necessarily have to be cylindrical, but could be rectilinear, so that a flat surface is provided for grounding if a suitable screw or terminal member is also provided. However, the grounding connection must be positioned to be accessible from the exterior of the coupling.

The coupling is used at the junction between two different conduits, one of which is an adequate grounding connector and the other of which is not. The use of the coupling permits adequate grounding of motors, transformers or other devices where the raceway has a section of flex or other conduit unsuitable for carrying a ground without running a ground wire the full length of the raceway or without using an unsightly and potentially dangerous exterior wire.

The section of conduit, which is unsuitable for ground purposes, could be in the center portions of the raceway or at the end of the raceway, as shown in FIG. 1.

The coupling shown can also be made with threads at both ends, and adapters used to go from the threaded connection to the flexible conduit or other conduit which is not a proper equipment grounding conductor.

The threads comprise a means for attaching the nongrounding conduit to the coupling even when an adapter is threaded into the coupling and the nongrounding conduit is directly connected to the adapter.

What is claimed is:

1. A coupling for use in combination with a ground wire and first and second electrical raceways including a first raceway which can serve as an electrical ground conduit, and a second nonground raceway which cannot serve as an electrical ground conduit that has the ground wire extending therethrough, said coupling comprising a tubular member having a first end portion that includes first means adapted for attaching and forming an electrical ground connection to a first ground conduit raceway; and a second end portion that includes second means, different from the first means, adapted for being attached to the second nonground conduit raceway, said tubular member having a continuous interior passage between said first and second end portions of size to carry a plurality of first electrical wires therethrough, and a grounding surface opening to said passage for being contacted by a ground wire in the passage, and wall means electrically connecting said grounding surface to said first means; and a screw member threadably mounted by said wall means and positioned so as to be accessible from the exterior of said tubular member, said screw member being threadable toward and away from said grounding surface a sufficient distance to securely clamp and electrically ground to the wall means a ground wire positioned in the interior passage and extending from the nonground conduit raceway when it is attached to the second means.

2. The combination specified in claim 1 wherein the wall means of the tubular member includes a boss member, an opening being defined in said boss member, and said screw member being mounted at substantially right angles to the axis of said opening whereby the end of said screw can engage said ground wire and can force the ground wire against the surface.

3. The combination specified in claim 2 wherein said opening is defined through said boss member at an acute angle to the axis of the tubular member and extends through said boss member from the interior to the exterior of said coupling.

4. The combination specified in claim 2 wherein said boss member comprises a raised portion on one portion of the wall means of said coupling, and extends outwardly beyond the general outer periphery of the coupling.

5. A coupling for first and second electrical raceways, a first of said raceways being one which can serve as a ground conduit, and a second of said raceways being one that which cannot serve as a ground conduit, said coupling comprising a tubular member, first and second means to attach the respective raceways at opposite ends of said tubular member, said tubular member including wall means, said wall means defining a boss member, said boss member having an opening therein with a longitudinal axis extending at an acute angle with respect to the coupling, a screw threadably mounted in said boss member and being threadable toward and away from said opening, said opening being open to the interior of said coupling so that a separate ground wire on the interior of said coupling can pass into said opening, said screw member being movable to engage a wire to be positioned in said opening, whereby said screw member can force a grounding wire in said opening against surfaces defining said opening when the screw member is tightened, said screw member being positioned on the interior of the coupling in position so that the head thereof can be reached from the exterior of said coupling through one end of said coupling, at least one of said first and second means being arranged to permit attaching one of the respective raceways to said coupling after said screw has been tightened onto a grounding wire.

* * * * *